United States Patent

Kliesch et al.

[11] Patent Number: 4,535,215
[45] Date of Patent: Aug. 13, 1985

[54] METHOD AND DEVICE FOR CONTROLLING THE WELDING PROCESS IN THE MANUFACTURING OF PIPES WITH LONGITUDINAL SEAMS

[75] Inventors: Wilfried Kliesch, Iserlohn; Friedrich-Otto Koch, Unna-Massen; Hans-Jürgen Wahl, Münster; Rolf Krebs, Hamm; Peter Schorr, Münster, all of Fed. Rep. of Germany; Heinz Strauch, deceased, late of Hagen-Emst, Fed. Rep. of Germany, by Ruth Strauch, Christel Strauch, legal representatives

[73] Assignee: Hoesch Werke AG, Dortmund, Fed. Rep. of Germany

[21] Appl. No.: 542,345

[22] Filed: Oct. 17, 1983

[30] Foreign Application Priority Data

Oct. 20, 1982 [DE] Fed. Rep. of Germany ....... 3238767

[51] Int. Cl.$^3$ .............................................. B23K 11/24
[52] U.S. Cl. .................................... 219/61.5; 219/8.5; 219/110

[58] Field of Search ....................... 219/8.5, 61.5, 110, 219/109

[56] References Cited

U.S. PATENT DOCUMENTS 3,573,416  4/1971  Drechsler ........................... 219/61.5

FOREIGN PATENT DOCUMENTS 57-206583  12/1982  Japan ................................. 219/61.5

Primary Examiner—Clifford C. Shaw
Attorney, Agent, or Firm—Max Fogiel

[57] ABSTRACT

It is necessary to determine the effects of welding pressure in order to control the high-frequency welding process in the manufacture of pipes with longitudinal seams. It has been discovered that measurements of the height of the welding bead provide an approximation that is satisfactory for determining the mass of the bead, which is proportional to welding pressure in known pipe geometry. The height of the bead is transmitted by an optical system to the diode matrix of a commercially available diode-matrix camera. The results are processed to control welding pressure.

4 Claims, 1 Drawing Figure

U.S. Patent  Aug. 13, 1985  4,535,215
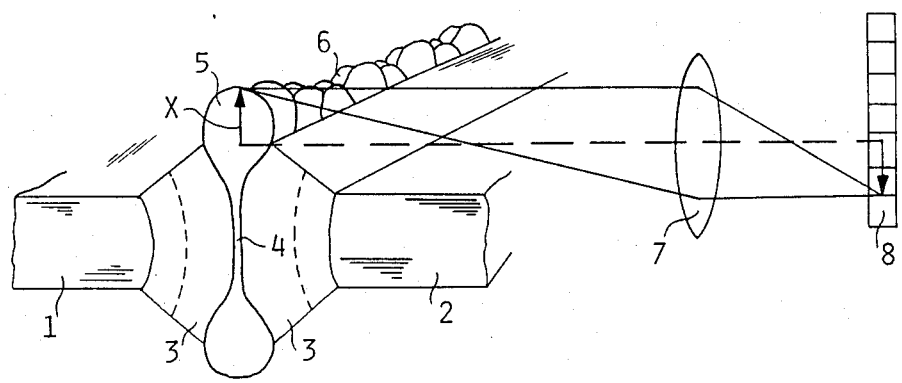

METHOD AND DEVICE FOR CONTROLLING THE WELDING PROCESS IN THE MANUFACTURING OF PIPES WITH LONGITUDINAL SEAMS

BACKGROUND OF THE INVENTION

The present invention relates to a method of and device for controlling the welding process in the manufacture of pipes with longitudinal seams by high-frequency welding a seam along a skelp that is continuously shaped into an open-seamed pipe, with the amount of electric power supplied, the welding pressure that forces the edges of the skelp together, and the welding temperature being maintained within ranges at which the seams will weld together properly.

The invention is based on that described in U.S. Pat. No. 3 573 416, from which measuring and controlling the welding pressure and the amount of electric power supplied is known.

The disadvantage to that method is that welding pressure can not be controlled in accordance with its result: the mass of the welding bead.

German Auslegeschrift No. 2 850 978 discloses a method of controlling welding pressure in accordance with bead mass by non-contact measurement of the width of the bead directly behind the welding point with a diode-matrix camera. This method of course assumes that the mass is proportional to the width. The same publication also discloses a variation of a known circuit for controlling the output of high-frequency welding equipment by combining measurements of temperature and bead width.

The method is, however, expensive and imprecise. Neither the amount of welding energy that must be supplied moment by moment to obtain a welding process that is as linear as possible nor the level of welding pressure can be satisfactorily determined from the width of the welding bead.

It is known from German Offenlegungsschrift No. 2 826 986 that, because the welding point does not advance at a constant rate, the bead that results from the high-frequency welding of longitudinal pipe seams etc. looks when viewed from above like a densely packed series of non-spherical globules of constantly increasing size with flattened contact surfaces. Thus, the mass of the bead differs continously.

SUMMARY OF THE INVENTION

The object of the present invention is to improve the known method in order to determine the welding pressure in existence at any given moment precisely.

This object is attained in accordance with the invention by a method in which welding pressure is controlled in accordance with the mass of the welding bead, which is continously measured without contact.

Basic to the invention is the recognition that the primary direction in which the welding bead is propagated is immediately behind the welding point and perpendicular to the surface of the pipe, along the plane of the edges of the skelp in other words. This is the point where the material is forced up and out of the seam by the sudden suturing of the edges and does not solidify until it cools.

The height of the welding bead is therefore a good first approximation of an index of prevailing welding pressure at varying but controlled temperature and with pipes of known wall thickness and diameter.

Bead height at any given instant in the welding process is not, however, a sufficient control parameter by itself, and welding pressure cannot be controlled even at the usual high welding rates at the frequency at which the height varies.

Thus, the height of the welding seam is averaged over a length corresponding to the minimum control-circuit response time and the resulting mean utilized to control the welding pressure.

BRIEF DESCRIPTION OF THE DRAWING

The invention will not be described with reference to the attached drawing, which schematically illustrates a greatly magnified cross-section through a length of welding seam.

DESCRIPTION OF THE PREFERRED EMBODIMENTS

The edges 1 and 2 of a skelp being shaped into an opened-seamed pipe are heated by high-frequency welding equipment, which is not illustrated, and forced together.

The heated upsets 3 thicken slightly and the molten material 4 is forced out of the seam and forms a welding bead 5. Bead 5 consists of a number of globules 6 of varying height that have been forced out of the seam.

A camera, which is not illustrated, with an optical system 7 and a diode matrix 8 measures the height x of each globule 6. Heights x are averaged over a period of 0.5 seconds for example and processed as a parameter for welding pressure.

Any deviation from the reference can be exploited in conjunction with the measured welding temperature, welding energy, and pipe geometry by means of a conventional control circuit, not illustrated, to control the welding process.

The welding bead is hot enough to glow and serve as a source of illumination for optical system 7.

We claim:

1. Method of controlling an electric welding process in the manufacture of pipes with longitudinal seams comprising the steps of: welding under high frequency a seam along a skelp that is continuously shaped into an open-seamed pipe; applying welding pressure that forces the edges of the skelp together; maintaining welding temperature within ranges at which the seams will weld together properly; controlling welding pressure in accordance with mass of a welding bead; and measuring absolute height of said bead for controlling the welding pressure continously without contacting said bead by sensing light emitted by melted fluid material of the bead, said absolute height of said bead being dependent on the mass of said welding bead and being proportional to the welding pressure.

2. Method as defined in claim 1 wherein height of said bead is determined by computation as it varies along the length of the seam and compared with given reference, and changing the welding pressure in response to deviations from said reference.

3. Apparatus for controlling an electric welding process in the manufacture of pipes with longitudinal seams comprising: means for welding under high frequency a seam along a skelp that is continously shaped into an open-seamed pipe; means for applying welding pressure that forces the edges of the skelp together; means for maintaining the welding temperature within ranges at which the seams will weld together properly; means for controlling welding pressure in accordance with mass of a welding bead; means for measuring absolute height of said bead continously to control welding pressure without contacting said bead by sensing light emitted by melted fluid material of the bead, said absolute height of said bead being dependent on the mass of said welding bead and being proportional to the welding pressure; said measuring means including a diode-matrix camera positioned at a side of the bead for measuring the height of the welding bead by sensing the emitted light.

4. Apparatus as defined in claim 3, and a reflecting device for reflecting optical rediation from said side of the welding bead, said diode-matrix camera measuring the height of the welding bead and being directed toward the reflected radiation.

* * * * *

UNITED STATES PATENT AND TRADEMARK OFFICE
Certificate

Patent No. 4,535,215                                      Patented August 13, 1985

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Friedrich-Otto Koch, Friedhelm Retzlaff and Hans-Jurgen Wahl.

Signed and Sealed this Twenty-sixth Day of August, 1986.

BRADLEY R. GARRIS,
*Office of the Deputy Assistant Commissioner for Patents.*